United States Patent
Delmas

[15] 3,657,802
[45] Apr. 25, 1972

[54] METHOD AND APPARATUS FOR SECURING METAL MOUNTING ELEMENTS ON A GLASS SURFACE

[72] Inventor: Jean-Raymond Delmas, Vanves, France
[73] Assignee: Societe Des Lunetiers, Paris, France
[22] Filed: May 12, 1969
[21] Appl. No.: 823,814

[52] U.S. Cl. .................................29/472.9, 228/1, 29/20, 156/73, 29/473.1, 29/497.5
[51] Int. Cl. .......................................B23k 31/02
[58] Field of Search ..............228/1; 29/20, 472.9, 473, .1, 29/497.5; 156/73

[56] References Cited

UNITED STATES PATENTS

| | | | |
|---|---|---|---|
| 3,203,715 | 8/1965 | Benbenek | 29/472.9 |
| 3,257,721 | 6/1966 | Jones | 228/1 |
| 3,372,851 | 3/1968 | Wands | 228/1 |
| 3,414,963 | 12/1968 | Cheng | 29/472.9 |
| 3,447,236 | 6/1969 | Hatcher | 29/472.9 |
| 3,461,542 | 8/1969 | Schoenthaler | 29/472.9 |
| 3,523,357 | 8/1970 | Meyer | 29/472.9 |

FOREIGN PATENTS OR APPLICATIONS

| | | | |
|---|---|---|---|
| 964,391 | 1/1950 | France | 29/473.1 |
| 1,244,868 | 9/1960 | France | 29/472.9 |

Primary Examiner—John F. Campbell
Assistant Examiner—Donald P. Rooney
Attorney—Holman & Stern

[57] ABSTRACT

A method of securing metal fasteners to the surface of a glass object, particularly a spectacle lens, which comprises the steps of applying against said surface, with a predetermined and adjustable pressure, a fastener made of a metal adapted to be easily welded to the glass object and consisting of a piece of extruded section shaped as consistent with the manner in which the fastener is to be accomadating subsequently, the glass-engaging base of said fastener accompdating the contour of said glass surface, and the step of vibrating each fastener at a supersonic frequency during a few seconds.

5 Claims, 7 Drawing Figures

PATENTED APR 25 1972 3,657,802

INVENTOR
JEAN-RAYMOND DELMAS
By Holman, Glascock, Downing & Seebold
ATTORNEYS

METHOD AND APPARATUS FOR SECURING METAL MOUNTING ELEMENTS ON A GLASS SURFACE

BACKGROUND OF THE INVENTION

The present invention is concerned with a method of securing metal mounting elements or fasteners to the surface of a glass object, and also with an apparatus for carrying out said method.

The possibility of securing metal mounting elements or fasteners to the surface of a glass article or object is extremely useful and advantageous in many cases, were it only for facilitating:

the positioning by suspension of a glass plate in a metal-coating vessel or like bell-shaped enclosure, the fitting of optical lenses in a lens mount or in an eyepiece, and the fitting of ophthalmic lenses on a spectacle mounting.

In this last case, mountings pertaining to the three main types mentioned hereinafter have been widely used:

1. The rim mounting requiring the preliminary grinding of the lens edge in order to form either a double bevel thereon, in case the lens is to be fitted in a metal or plastic frame or rim, or a groove if the lens is to be retained in its mounting by using a simple wire, usually a Nylon wire. It is known that the first alternative is considered as rather obsolete, and that the second one is objectionable in that it is delicate to carry out and/or most likely to give a fragile article, especially if the lens edge is relatively thin.
2. The glued mounting performed by using a rapidly polymerizable resin is extremely simple but the end product is also fragile.
3. The screw mounting, requiring the preliminary drilling of the glass, is certainly reliable but the drilling operation is always attended by the risk of breaking the lens.

SUMMARY OF THE INVENTION

Now it is the essential object of the present invention to provide a method of securing metal fasteners to a glass surface which combines the advantageous features of these conventional mounting methods but is nevertheless free of their inconveniences; in other words, the method of this invention is applicable without practically any risk of breaking the glass while providing an extremely reliable and strong glass-to-metal assembly.

To this end, the method of the present invention comprises the following steps:

a. Applying to a surface of a glass object, under a predetermined adjustable pressure, fasteners made from a metal easily weldable to glass and which consist each of a piece of section having in cross section a shape consistent with the type of mounting to be fitted to said fasteners and having a base accommodating the contour of said glass surface;

b. vibrating said fasteners, preferably in succession, at a supersonic frequency, each during a few seconds.

Provided that the two adjacent glass and metal surfaces are properly applied against each other, a very satisfactory and reliable metal-to-glass weld is thus obtained, due to the local expansion of these two materials which assists their mutual molecular penetration.

Advantageously, said fasteners consist of aluminum and are sections cut from an extruded material having its cross-sectional contour designed as a function of the manner in which the fasteners are secured to the glass, on the one hand, and on the mounting on the other hand, with the supersonic frequency utilized being preferably of the order of 40,000 Hz.

It is another object of this invention to provide an apparatus for carrying out the method disclosed hereinabove, which is designed particularly for properly positioning and subsequently locking in the selected positions on the one hand the glass object before the welding step, and on the other hand the fasteners. The general arrangement of this apparatus is derived directly from the steps constituting the method of this invention, with its structure being designed in each specific case as a function of the manner in which the fasteners are to be secured to the glass and to the mounting, therefore of the shape of these fasteners.

BRIEF DESCRIPTION OF THE DRAWINGS.

The invention will be better understood from the following description of a typical form of embodiment of the apparatus for carrying out the method described hereinabove, this description being made with reference to the accompanying drawings in which.

DESCRIPTION OF THE PREFERRED EMBODIMENT.

Figure 1:
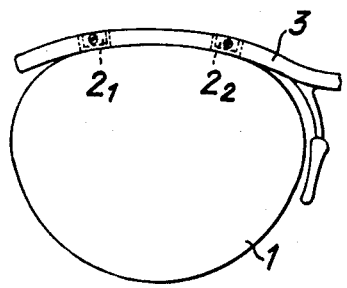
FIG. 1 is a front elevational view showing a spectacle lens secured to a mounting by means of two fasteners welded to the lens according to the method of this invention.

Referring firstly to FIG. 1, it will be seen that an ophthalmic lens 1 is provided with two metal fasteners $2_1$, $2_2$ welded to the upper edge of the lens and adapted to be secured by means of screws to a front bar 3 of a spectacle mounting.

Figure 2:
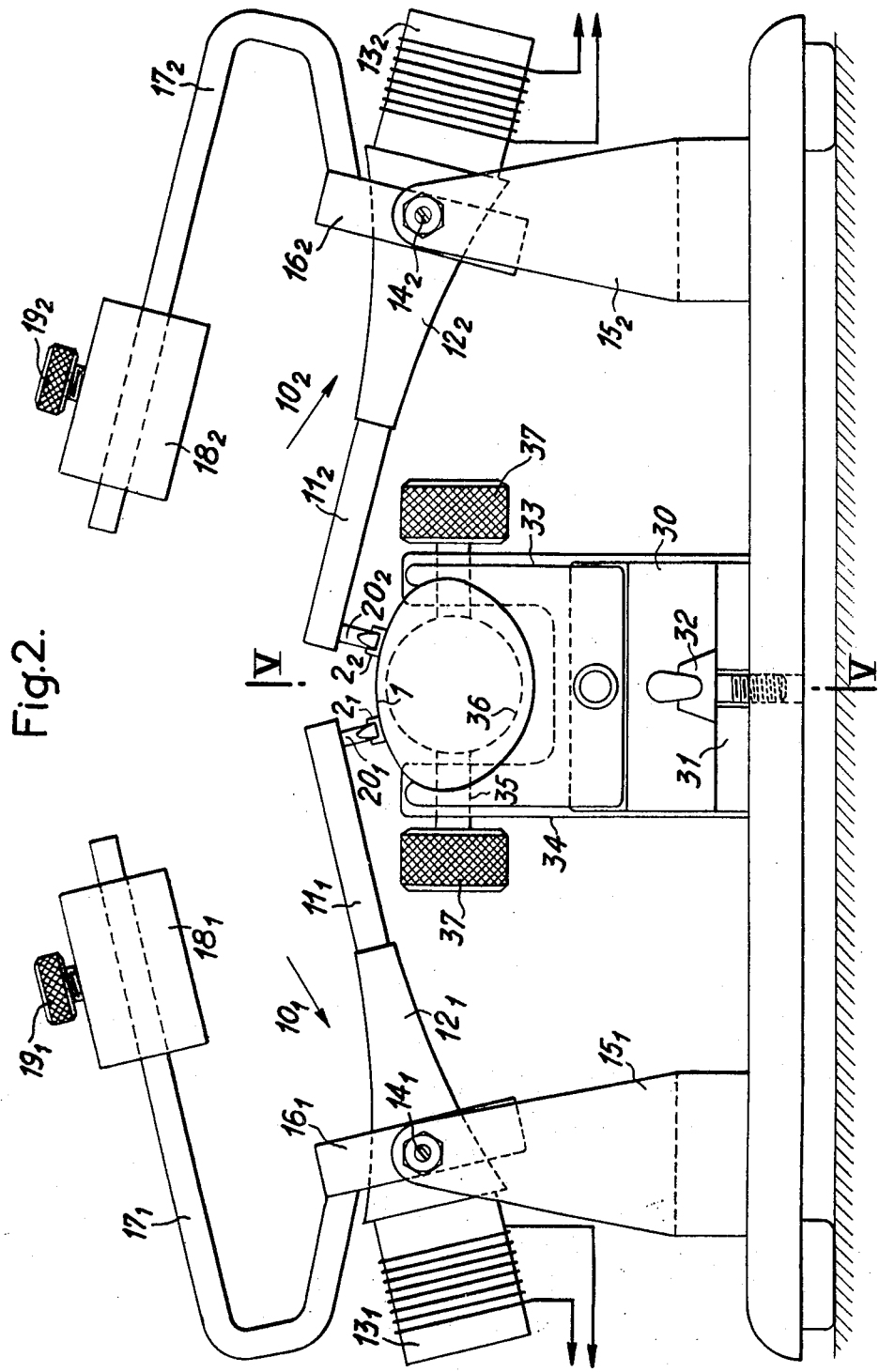
FIG. 2 is a diagrammatic front elevational view showing a typical form of embodiment of the apparatus of this invention for welding fasteners of the type shown in FIG. 1.

Referring now to FIG. 2, it will be seen that an apparatus according to this invention comprises essentially two identical vibrating assemblies $10_1$ and $10_2$ disposed symmetrically in relation to a lens supporting device 30. Each vibrating assembly, for example assembly $10_1$, carries an adjustable vibrating rod or "Sonotrode" of known type, having a cylindrical end $11_1$ and an intermediate portion $12_1$ of revolution with an exponential meridian. The dimensions of the end $11_1$ and portion $12_1$ of this rod are calculated to obtain a resonance frequency of the assembly of the order of 40,000 Hz.

The excitation of this rod $11_1$, $12_1$ is obtained by energizing a magnetostrictive vibrator $13_1$ known per se and connected to an adjustable frequency generator (not shown) of electrical oscillations, also known per se.

The assembly $10_1$ is pivotally mounted about a horizontal pin 14$l$. This pin carried by a bracket 15, is rigid with a circular metal collar $16_1$ adapted to clamp the section $12_1$ of the assembly by means of three set screws (not shown) disposed at spaced intervals, therefore at the vertices of an equilateral triangle. The same collar $16_1$ carries on the other hand an arm $17_1$ bent twice on itself so that the outermost portion of this arm be substantially parallel to the geometric axis of rod $11_1$–$12_1$. A counterweight 181 is adapted to slide along this outermost portion of arm $17_1$ to an adjustment position in which it is adapted to be locked by means of a set screw $19_1$, for a purpose to be explained presently.

Figure 3:
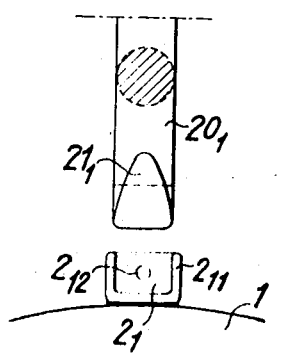
FIGS. 3 and 4 are fragmentary detail views, respectively in front elevation and in vertical section, showing the vibrating pin of the apparatus of FIG. 2, with a fastener ready to be fitted on said pin.
Figure 4:
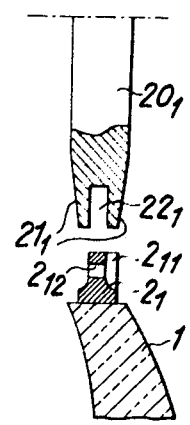

The rod $11_1$, $12_1$ carries near its free end a cylindrical pin $20_1$ secured to the rod end through any suitable means (not shown), so as to extend substantially at right angles to said rod. As shown in FIGS. 3 and 4, the pin $20_1$ has on the one hand a bevelled end, i.e. a pair of convergent or oblique flat faces $21_1$ disposed symmetrically in relation to a diametral plane of said pin, and on the other hand a longitudinal median slot $22_1$.

On this pin $20_1$ an aluminium fastener $2_1$ is adapted to be fitted or engaged in smooth frictional contact, with this fastener consisting in the example illustrated of a short piece of inverted-T metal section. The web of the T is adapted to engage the slot $22_1$. The fastener $2_1$ also comprises a pair of lateral flanges $2_{11}$ adapted on the one hand to reinforce the T-shaped section and on the other hand to improve the fitting of the fastener $2_1$ on said pin $20_1$. Finally, the web of the T has a central through hole $2_{12}$ to permit the insertion of a screw for securing the fastener $2_1$ to the mounting 3 (see FIG. 1.)

Figure 5:
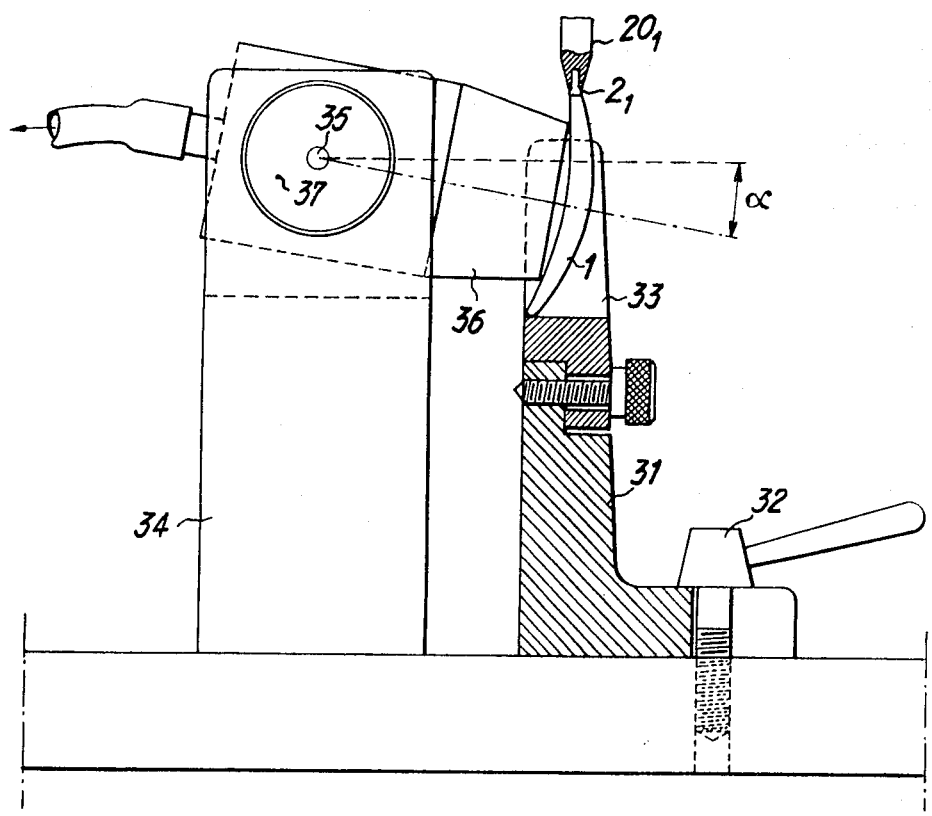
FIG. 5 is a part-sectional view showing only the lens-support of the apparatus of FIG. 2, the section being taken along the line V—V of FIG. 2.

Referring now to FIGS. 2 and 5, it will be seen that the lens support 30 comprises a metal base 31 adjustable and adapted to be locked in the selected position by means of a wing screw 32. Another screw is provided for adjustably securing to this base 31 a frame 33 of plastic or other suitable material, of which the contour or edge of a hollow portion corresponds in shape to the contour of the opthalmic lens 1 in order to prevent any movement of this lens in its plane (i.e. parallel to the plane of FIG. 2).

The lens support 30 comprises on the other hand an upstanding bracket 34 having a strap-shaped upper portion between the arms of which is adjustably mounted a lens-holding block 36 pivoted by means of a transverse shaft 35 and adapted to be locked in the selected position by means of a pair of knurled knobs 37. The lens 1 can be held against the front face of block 36, for example, by the action of pneumatic vacuum produced either by a vacuum pump (not shown) or by a suction-cup (not shown). Thus, the ophthalmic lens 1 can be inclined by an angle $\alpha$ so that the upper edge of the lens (see FIG. 5) is substantially horizontal and the fasteners $2_1$, $2_2$ fitted on the pins $20_1$, $20_2$ of vibrating assemblies $10_1$, $10_2$ respectively can be applied with a pressure adjustable by means of the counterweights $18_1$, $18_2$ against said upper edge.

This apparatus is utilized as follows:

The fasteners $2_1$, $2_2$ are fitted on the pins $20_1$, $20_2$, and the position of lens 1 is properly adjusted. The fasteners $2_1$, $2_2$ are then pressed against the top edge of lens 1 by means of the counterweights $18_1$, $18_2$. Then the assembly $10_1$ is vibrated during a few seconds, and subsequently the other assembly $10_2$ is also vibrated during a few seconds. Thus, the two welds are obtained almost simultaneously.

The vibrations of rods $11_1$, $12_1$ and $11_2$, $12_2$ under resonance conditions can be adjusted by observing the screen of an oscillograph (not shown) incorporated in the oscillation generator, with this adjustment being subsequently preserved by using a self-monitoring system of known type (not shown), all these means being well known per se.

Figure 6:
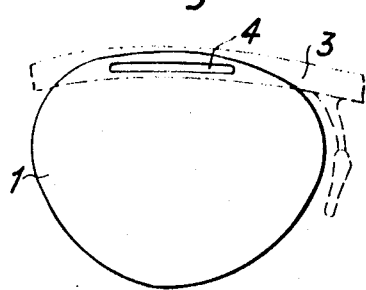
FIGS. 6 and 7 are diagrammatic views, respectively in front elevation and in side elevation, showing another type of fastener and another manner of securing the same to a spectacle lens and to the spectacle mounting.
Figure 7:
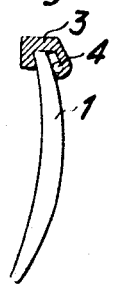

In the above description it is assumed that the fasteners are secured to the top edge of a spectacle lens and adapted to be secured in turn by means of screws to the spectacle mounting. However, this specific arrangement should not be construed as limiting the field of the invention since it would also be possible for example, and as shown in FIGS. 6 and 7, to use a fastener in the form of a cylindrical wire 4, possibly sectioned as required by the curvature of the lens 1, to weld or fuse this fastener not to the top edge of the lens 1 but simply on a small flat surface thereof, so that the thus equipped lens can subsequently fit by snap action into the mounting 3. In this case, of course, the apparatus described hereinabove with reference to FIGS. 2 to 5 would be modified accordingly, as will readily occur to anybody conversant with the art.

I claim:

1. A method of securing metal fasteners to the surface of a glass spectacle lens, which comprises the step of applying against said surface, with a predetermined and adjustable pressure, at least one fastener made of a metal adapted to be easily welded to the glass material of the lens and consisting of a piece of extruded section shaped as consistent with the manner in which the fastener is to be used subsequently, each fastener having a glass-engaging base accommodating the contour of said glass lens surface, and being applied against said surface of the lens in a predetermined orientation also consistent with the manner in which the fastener is to be used subsequently, and the step of vibrating each fastener at a supersonic frequency during a few seconds while maintaining constant said predetermined orientation.

2. The method as set forth in claim 1, wherein, upon a plurality of fasteners being secured to a same glass surface, said fasteners are vibrated separately and successively.

3. The method as set forth in claim 1, wherein said at least one fastener is vibrated at a supersonic frequency of the order of 40,000 Hz.

4. A method of securing metal fasteners to the surface of a glass object, particularly a spectacle lens, which comprises applying against said surface, with a predetermined and adjustable pressure, at least one fastener made of a metal adapted to be easily welded to the glass object and consisting of a relatively short piece of T-section having a small hole formed through the central web of the T- to permit a subsequent insertion of a retaining screw therethrough, the glass-engaging base of the fastener accommodating the contour of said glass surface, and vibrating said at least one fastener at a supersonic frequency during a few seconds while maintaining constant said predetermined orientation.

5. A method of securing metal fasteners to the surface of a glass object, particularly a spectacle lens, which comprises applying against said surface, with a predetermined and adjustable pressure, at least one fastener of a material adapted to be easily welded to the glass object and consisting of a section of cylindrical wire to permit a subsequent snap-fitting of the glass and fastener assembly in a mounting, the glass-engaging base of the fastener accommodating the contour of said glass surface, and vibrating said at least one fastener at a supersonic frequency during a few seconds while maintaining constant said predetermined orientation.

* * * * *